United States Patent
Sun et al.

(10) Patent No.: US 11,916,939 B2
(45) Date of Patent: Feb. 27, 2024

(54) ABNORMAL TRAFFIC DETECTION METHOD AND ABNORMAL TRAFFIC DETECTION DEVICE

(71) Applicant: Acer Cyber Security Incorporated, Taipei (TW)

(72) Inventors: Ming-Kung Sun, Taipei (TW); Tsung-Yu Ho, Taipei (TW); Zong-Cyuan Jhang, Taipei (TW); Chiung-Ying Huang, Taipei (TW)

(73) Assignee: Acer Cyber Security Incorporated, Taipei (TW)

( * ) Notice: Subject to any disclaimer, the term of this patent is extended or adjusted under 35 U.S.C. 154(b) by 563 days.

(21) Appl. No.: 17/015,027

(22) Filed: Sep. 8, 2020

(65) Prior Publication Data

US 2021/0136099 A1    May 6, 2021

(30) Foreign Application Priority Data

Oct. 31, 2019   (TW) .................... 108139410

(51) Int. Cl.
*H04L 9/40*        (2022.01)
*G06F 16/22*       (2019.01)
(Continued)

(52) U.S. Cl.
CPC ...... *H04L 63/1425* (2013.01); *G06F 16/2237* (2019.01); *G06F 16/258* (2019.01);
(Continued)

(58) Field of Classification Search
CPC ..... G06F 16/2237; G06F 16/258; G06N 3/08; H04L 2463/144; H04L 63/0236;
(Continued)

(56) References Cited

U.S. PATENT DOCUMENTS 9,843,596 B1 * 12/2017 Averbuch ............... G06F 21/554
10,594,707 B2 * 3/2020 El-Moussa .......... H04L 63/1416
(Continued)

FOREIGN PATENT DOCUMENTS

| CN | 106209868 | 12/2016 |
| TW | M542807 | 6/2017 |
| TW | I666568 | 7/2019 |

OTHER PUBLICATIONS

Hyun Min Song, Jiyoung Woo, Huy Kang Kim, In-vehicle network intrusion detection using deep convolutional neural network, Vehicular Communications, vol. 21, 2020, 100198, ISSN 2214-2096 (Elsevier Jan. 2019) (Year: 2019).*

(Continued)

*Primary Examiner* — Theodore C Parsons
(74) *Attorney, Agent, or Firm* — JCIPRNET

(57) ABSTRACT

An abnormal traffic detection method is provided according to an embodiment of the disclosure. The method includes: obtaining network traffic data of a target device; sampling the network traffic data by a sampling window with a time length to obtain sampling data; generating, according to the sampling data, an image which presents a traffic feature of the network traffic data corresponding to the time length; and analyzing the image to generate evaluation information corresponding to an abnormal traffic. In addition, an abnormal traffic detection device is also provided according to an embodiment of the disclosure to improve a detection ability and/or an analysis ability for the abnormal traffic and/or a malware.

16 Claims, 7 Drawing Sheets

(51) Int. Cl.
    *G06F 16/25*     (2019.01)
    *G06N 3/08*     (2023.01)

(52) U.S. Cl.
    CPC ........... *G06N 3/08* (2013.01); *H04L 63/0236* (2013.01); *H04L 63/1416* (2013.01); *H04L 63/1433* (2013.01)

(58) Field of Classification Search
    CPC ............. H04L 63/1416; H04L 63/1425; H04L 63/1433; H04L 63/145
    See application file for complete search history.

(56) References Cited

U.S. PATENT DOCUMENTS

| | | | |
|---|---|---|---|
| 11,381,583 B1* | 7/2022 | Ellis | G06V 10/774 |
| 2003/0097439 A1* | 5/2003 | Strayer | H04L 63/1408 709/224 |
| 2016/0173516 A1 | 6/2016 | Raugas et al. | |
| 2017/0063905 A1 | 3/2017 | Muddu et al. | |
| 2018/0063163 A1* | 3/2018 | Pevny | H04L 67/02 |
| 2018/0115567 A1* | 4/2018 | El-Moussa | H04L 63/1416 |
| 2019/0036952 A1* | 1/2019 | Sim | G06K 9/6267 |
| 2019/0042745 A1* | 2/2019 | Chen | G06F 21/566 |
| 2019/0045207 A1* | 2/2019 | Chen | G06T 7/11 |
| 2019/0173893 A1 | 6/2019 | Muddu et al. | |
| 2020/0202160 A1* | 6/2020 | Park | G06V 30/1916 |

OTHER PUBLICATIONS

Wei Wang, Ming Zhu, Xuewen Zeng, Xiaozhou Ye and Yiqiang Sheng, "Malware traffic classification using convolutional neural network for representation learning," 2017 International Conference on Information Networking (ICOIN), 2017, pp. 712-717, doi: 10.1109/ICOIN.2017.7899588. (Year: 2017).*

Y. Xiao, C. Xing, T. Zhang and Z. Zhao, "An Intrusion Detection Model Based on Feature Reduction and Convolutional Neural Networks," in IEEE Access, vol. 7, pp. 42210-42219, 2019, doi: 10.1109/ACCESS.2019.2904620. (Year: 2019).*

"Search Report of Europe Counterpart Application", dated Mar. 25, 2021, p. 1-p. 12.

* cited by examiner

| Sampling point | 1 | 2 | 3 | 4 | 5 | 6 | 7 | 8 | 9 |
|---|---|---|---|---|---|---|---|---|---|
| Sampling value | 0 | 0 | 10 | 20 | 50 | 20 | 30 | 70 | 80 |

↓ Normalization

| Sampling point | 1 | 2 | 3 | 4 | 5 | 6 | 7 | 8 | 9 |
|---|---|---|---|---|---|---|---|---|---|
| Sampling value | 0 | 0 | 0.1 | 0.2 | 0.5 | 0.2 | 0.3 | 0.7 | 0.8 |

FIG. 5

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 1 |
| 0 | 0 | 0 | 0 | 0 | 0 | 0 | 1 | 1 |
| 0 | 0 | 0 | 0 | 0 | 0 | 0 | 1 | 1 |
| 0 | 0 | 0 | 0 | 1 | 0 | 0 | 1 | 1 |
| 0 | 0 | 0 | 0 | 1 | 0 | 0 | 1 | 1 |
| 0 | 0 | 0 | 0 | 1 | 0 | 1 | 1 | 1 |
| 0 | 0 | 0 | 1 | 1 | 1 | 1 | 1 | 1 |
| 0 | 0 | 1 | 1 | 1 | 1 | 1 | 1 | 1 |

FIG. 6

ABNORMAL TRAFFIC DETECTION METHOD AND ABNORMAL TRAFFIC DETECTION DEVICE

CROSS-REFERENCE TO RELATED APPLICATION

This application claims the priority benefit of Taiwan application serial no. 108139410, filed on Oct. 31, 2019. The entirety of the above-mentioned patent application is hereby incorporated by reference herein and made a part of this specification.

TECHNICAL FIELD

The disclosure relates a network security technology, and more particularly, relates to an abnormal traffic detection method and an abnormal traffic detection device.

BACKGROUND

Zombie network (a.k.a. Botnet) normally refers to a plurality of devices (e.g., cell phones, computers or other types of networking devices) controlled by a malware. Botnet may be used to send spam or conduct malicious network attacks, such as distributed denial-of-service attack (DDoS). The devices in Botnet can avoid detection by changing behavioral features and other mechanisms, thereby increasing tracing difficulty. An important feature of Botnet is the ability to issue attack commands to the infected devices through relay stations. The general anti-virus software can usually detect only attack behaviors performed by the infected devices, and sources of the attack commands (i.e., the relay stations) are often difficult to trace.

In general, detection mechanisms for Botnet include a black/white list comparison, a network behavior comparison and a malware behavioral analysis. The black/white list comparison can only compare and filter known malicious Internet Protocol (IP) addresses and/or network domain names. The network behavior comparison is to compare and detect known network abnormal behaviors. The malware behavioral analysis attempts to trace the relay stations by, for example, adopting a reverse engineering analysis and recording malware behaviors of the infected devices. However, because these detection mechanisms all require feature analysis and classification on mass data to be performed by security experts, the detection mechanisms are often unable to catch up with feature changes of the malware in actual use.

SUMMARY

The disclosure provides an abnormal traffic detection method and an abnormal traffic detection device that can effectively improve a detection efficiency for the abnormal traffic.

An abnormal traffic detection method is provided according to an embodiment of the disclosure. The method includes: obtaining network traffic data of a target device; sampling the network traffic data by a sampling window with a time length to obtain sampling data; generating, according to the sampling data, an image which presents a traffic feature of the network traffic data corresponding to the time length; and analyzing the image to generate evaluation information corresponding to an abnormal traffic.

An embodiment of the disclosure further provides an abnormal traffic detection device, which includes a storage device and a processor. The storage device stores network traffic data of a target device. The processor is coupled to the storage device. The processor samples the network traffic data by a sampling window to obtain sampling data. The sampling window has a time length. The processor generates an image according to the sampling data. The image presents a traffic feature of the network traffic data corresponding to the time length. The processor analyzes the image to generate evaluation information corresponding to an abnormal traffic.

An abnormal traffic detection method is further provided according to an embodiment of the disclosure. The method includes: obtaining network traffic data of a target device; sampling the network traffic data by a first sampling window to obtain first sampling data, wherein the first sampling window has a first time length; sampling the network traffic data by a second sampling window to obtain second sampling data, wherein the second sampling window has a second time length, and the first time length is different from the second time length; generating a first image according to the first sampling data; generating a second image according to the second sampling data; and generating evaluation information corresponding to an abnormal traffic according to the first image and the second image.

An embodiment of the disclosure further provides an abnormal traffic detection device, which includes a storage device and a processor. The storage device stores network traffic data of a target device. The processor is coupled to the storage device. The processor samples the network traffic data by a first sampling window to obtain first sampling data. The first sampling window has a first time length. The processor samples the network traffic data by a second sampling window to obtain second sampling data. The second sampling window has a second time length, and the first time length is different from the second time length. The processor generates a first image according to the first sampling data. The processor generates a second image according to the second sampling data. The processor generates evaluation information corresponding to an abnormal traffic according to the first image and the second image.

Based on the above, the embodiments of the disclosure can sample the network traffic data by the sampling window with at least one time length and automatically detect the sampling data by an image analysis mechanism. In this way, compared with traditionally relying on security experts to conduct a large amount of traffic data analysis, the abnormal traffic detection method and the abnormal traffic detection device of the embodiments of the disclosure can effectively improve the detection efficiency for the abnormal traffic.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 5 is a schematic diagram illustrating a second normalization operation according to an embodiment of the disclosure.

FIG. 6 is a schematic diagram illustrating a two-dimensional bit map according to an embodiment of the disclosure.

DESCRIPTION OF THE EMBODIMENTS

Figure 1:
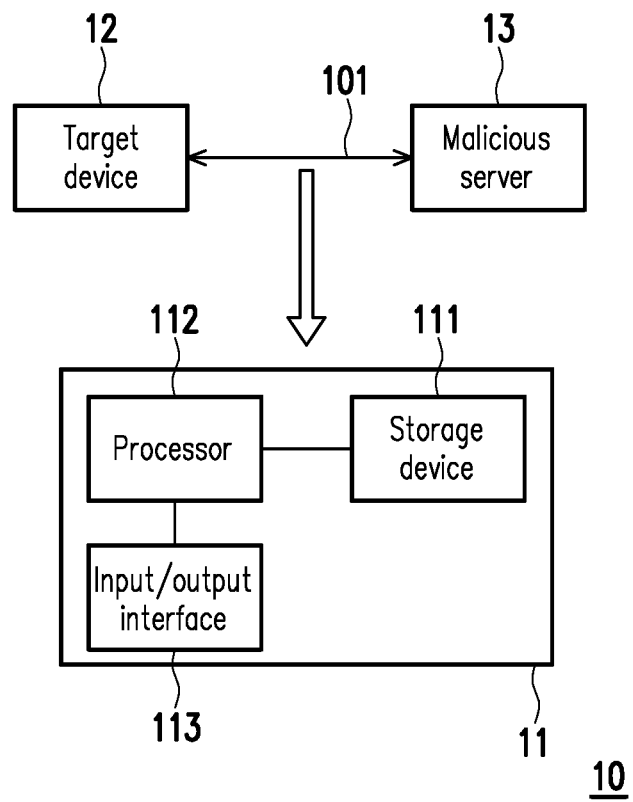
FIG. 1 is a schematic diagram illustrating an abnormal traffic detection system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram illustrating an abnormal traffic detection system according to an embodiment of the disclosure. Referring to FIG. 1, an abnormal traffic detection system 10 includes an abnormal traffic detection device 11 and a target device 12. The abnormal traffic detection device 11 may be an electronic device having networking and computing functions, such as a smart phone, a tablet computer, a notebook computer, a desktop computer, an industrial computer, a server host, a switch or a router. The device (a.k.a. the target device) 12 may be an electronic device having networking and computing functions, such as a smart phone, a tablet computer, a notebook computer, a desktop computer, an industrial computer, an Internet of things (IoT) device or a server host.

The target device 12 may communicate with a malicious server 13 or other network terminals via a connection 101 in wired and/or wireless manners. The connection 101 may include the Internet. In the following embodiments, it is assumed that the malicious server 13 is a relay station (a.k.a. a malicious relay station or a command and control server). In an embodiment, assuming that the target device 12 is an infected device, a malware in the target device 12 can communicate with the malicious server 13 regularly or according to a specific rule, and the target device 12 can attack other network terminals according to attack commands of the malicious server 13. In addition, the target device 12 can also communicate with other network terminals. For example, a user can browse web pages and the like through the target device 12.

The abnormal traffic detection device 11 can obtain network traffic data of the target device 12. For example, the network traffic data of the target device 12 may include log data (e.g., log files) for a network communication between the target device 12 and any network terminal. For example, the log data may include a connection time, a source Internet Protocol (IP) address, a destination IP address, a transmitted data amount at a specific time point and/or other connection information of the network communication between the target device 12 and one specific network terminal. In an embodiment, if the target device 12 is the infected device, the network traffic data of the target device 12 may include the log data of the network communication between the target device 12 and the malicious server 13 via the connection 101.

The abnormal traffic detection device 11 can obtain and analyze the network traffic data of the target device 12. In an embodiment, the abnormal traffic detection device 11 can automatically determine, according to the network traffic data of the target device 12, whether the network traffic data include an abnormal traffic, a type and/or a risk level of the abnormal traffic. Once the network traffic data include the abnormal traffic, the target device 12 has a high probability of being infected by the malware and/or being a part of Botnet. In addition, if the risk level of the abnormal traffic is higher, the malware that infects the target device 12 may be more dangerous.

In an embodiment, the abnormal traffic detection device 11 can automatically generate evaluation information corresponding to the abnormal traffic according to the network traffic data of the target device 12. The evaluation information can reflect whether the network traffic data of the target device 12 include the abnormal traffic, and the type and/or the risk level of the abnormal traffic. Further, in an embodiment, according to the evaluation information, the abnormal traffic detection device 11 can further determine whether the target device 12 is infected by the malware, a probability that the target device 12 is infected by the malware, whether the target device 12 belongs to a part of Botnet, a probability that the target device 12 belongs to a part of Botnet, a type of the malware infected and/or a risk level of the malware.

In an embodiment, the abnormal traffic detection device 11 includes a storage device 111, a processor 112 and an input/output interface 113. The storage device 111 is configured to store data. The storage device 111 may include a volatile storage media and a non-volatile storage media. For example, the volatile storage media may include a random access memory (RAM), and the non-volatile storage media may include a read only memory (ROM), a solid state disk (SSD) or a traditional hard disk (HDD). The processor 112 is coupled to the storage device 111. The processor 112 may be a central processing unit (CPU), a graphic processor (GPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processor 112 can control the overall or partial operation of the abnormal traffic detection device 11. The input/output interface 113 is coupled to the processor 112. The input/output interface 113 may include various input/output interfaces, such as a screen, a touch screen, a touch pad, a mouse, a keyboard, a physical button, a speaker, a microphone, a wired network card and/or a wireless network card, but the type of the input/output interface is not limited thereto.

In an embodiment, the processor 112 can receive the network traffic data of the target device 12 from the target device 12 via the input/output interface 113. For example, the processor 112 may download the network traffic data of the target device 12 from a storage medium of the target device 12 or from a router and/or switch connected to the target device 12. Alternatively, in an embodiment, the processor 112 can monitor the connection 101 (or a network interface of the target device 12) via the input/output interface 113 to obtain the network traffic data of the target device 12. The obtained network traffic data of the target device 12 may be stored in the storage device 111. In addition, this network traffic data can be network traffic data within a specific time range. For example, the time range may be 5 hours, 12 hours, 3 days, 1 month or 1 year. The disclosure is not limited in this regard.

In an embodiment, the processor 112 may filter the network traffic data of the target device 12 to initially reduce a data amount of to-be-analyzed data. For example, in an embodiment, the processor 112 may filter out the network traffic data with the source IP address belonging to an IP address of an external network terminal in the network traffic data, and (only) retain the network traffic data with the source IP address belonging to an IP address of the target device 12. Alternatively, in an embodiment, the processor 112 may filter out the network traffic data with the destination IP address marked as safe in the network traffic data. For example, IP addresses of certain safe websites, such as Google and/or Facebook, can be recorded in a white list. The network traffic data with the destination IP address belonging to the white list may be filtered out, and the network traffic data with the destination IP address not belonging to the white list may be retained. Moreover, in an embodiment, data in the whitelist may be dynamically deleted or expanded. For example, the destination IP addresses marked as safe in the whitelist may be dynamically updated based on the World Site Ranking (Alexa). The above filtering mechanisms may be used alternatively or in combination.

Figure 2:
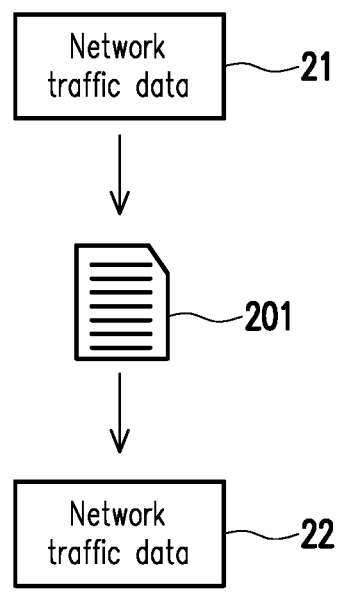
FIG. 2 is a schematic diagram illustrating how network traffic data are filtered according to an embodiment of the disclosure.

FIG. 2 is a schematic diagram illustrating how network traffic data are filtered according to an embodiment of the disclosure. Referring to FIG. 2, network traffic data 21 may be filtered through a white list 201. Network traffic data 22 is used to represent the filtered network traffic data 21. The white list 201 may be used to filter out the network traffic data associated with a specific source IP address, the network traffic data associated with a specific destination IP address and/or the network traffic data associated with a specific keyword in the network traffic data 21. In an embodiment, since a part of the network traffic data in the network traffic data 21 is filtered out, a data amount of the network traffic data 22 may be smaller than a data amount of the network traffic data 21. Moreover, in an embodiment, the network traffic data 21 of the target device 12 may not be filtered and/or a filtering rule for filtering the network traffic data 21 may be dynamically adjusted (e.g., expanded or deleted).

The processor 112 can sample the network traffic data of the target device 12 by at lest one sampling window to obtain sampling data. The used sampling window may correspond to a specific time length. For example, the processor 112 can select the specific time length from a plurality of candidate time lengths. The processor 112 can generate a corresponding sampling window according to the selected time length and sample the network traffic data by that corresponding sampling window.

Figure 3:
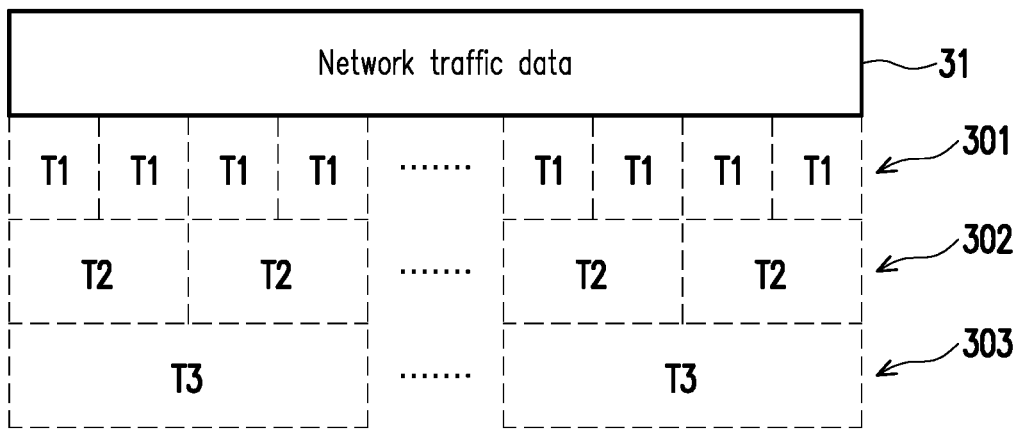
FIG. 3 is a schematic diagram illustrating how the network traffic data are sampled by a sampling window according to an embodiment of the disclosure.

FIG. 3 is a schematic diagram illustrating how the network traffic data are sampled by a sampling window according to an embodiment of the disclosure. Referring to FIG. 3, the network traffic data 31 may be the network traffic data 21 or 22 of FIG. 2. A sampling window 301 has a time length T1. A sampling window 302 has a time length T2. A sampling window 303 has a time length T3. The time lengths T1 to T3 are different from each other. The time length T1 is less than the time length T2. The time length T2 is less than the time length T3. All the time lengths T1 to T3 are the candidate time lengths. In addition, the number of the candidate time lengths that can be selected may be more (e.g., 4) or less (e.g., 2). The disclosure is not limited in this regard.

At least one of the sampling windows 301 to 303 may be used to sample the network traffic data 31. For example, if the time length T1 is 0.5 hours, the time length T2 is 1 hour, the time length T3 is 2 hours and the network traffic data 31 is network traffic data of 6 hours, the network traffic data 31 may be sampled by 12 sampling windows 301 (0.5×12=6) for obtaining 12 0.5-hour consecutive sampling data, sampled by 6 sampling windows 302 (1×6=6) for obtaining 6 1-hour consecutive sampling data, and/or sampled by 3 sampling windows 303 (2×3=6) for obtaining 3 2-hour consecutive sampling data.

It should be noted that, the sampling windows 301 to 303 correspond to the different time lengths T1 to T3. Therefore, the time length of the sampling data obtained by sampling through the sampling windows 301 to 303 will also be different. For example, time lengths of the sampling data obtained by sampling through the sampling windows 301 to 303 may be identical to the time lengths T1 to T3, respectively. Further, the disclosure does not limit values of the time lengths T1 to T3 as long as the time lengths T1 to T3 are different from each other.

In an embodiment, the processor 112 can adjust the time lengths of the sampled data through a normalization operation (also referred to as a first normalization operation). For example, the network traffic data 31 of FIG. 3 may include a plurality of sampling values and a plurality of sampling points, and each of the sampling values corresponds to one of the sampling points. One sampling point can be a sampling unit of 1 second or other time lengths. In the following embodiments, 1 second is taken as a time unit of one sampling point. One sampling value reflects a transmitted data amount corresponding to one specific sampling point. For example, consecutive N sampling values in the network traffic data 31 may represent a data transmission amount of the target device 12 within N seconds. A counting unit of the data transmission amount may be byte. If no data is transmitted at a time point corresponding to one specific sampling point, the sampling value corresponding to that specific sampling point may be set to zero or other preset values. In the first normalization operation, the processor 112 can adjust a total of the sampling points in the sampling data from N to M, and N is different from M. That is to say, in an embodiment, the first normalization operation may be used to normalize the total of the sampling points in the sampling data.

Figure 4:
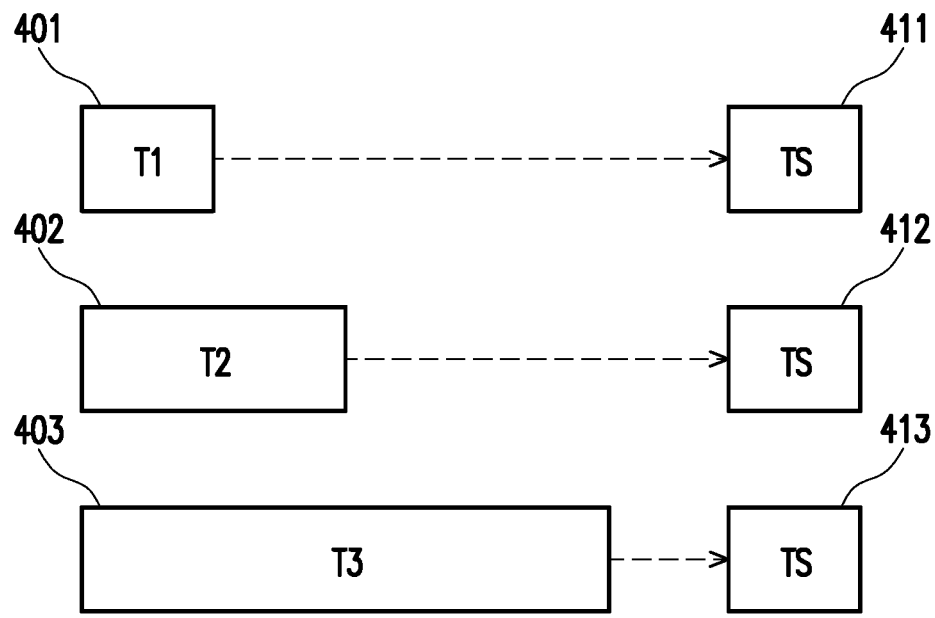
FIG. 4 is a schematic diagram illustrating a first normalization operation according to an embodiment of the disclosure.

FIG. 4 is a schematic diagram illustrating a first normalization operation according to an embodiment of the disclosure. Referring to FIG. 3 and FIG. 4, sampling data 401 represents sampling data sampled by the sampling window 301. Sampling data 402 represents sampling data sampled by the sampling window 302. Sampling data 403 represents sampling data sampled by the sampling window 303. The sampling data 401 to 403 have data lengths T1 to T3, respectively. The data length T1 corresponds to N1 sampling points. The data length T2 corresponds to N2 sampling points. The data length T3 corresponds to N3 sampling points. N3 is greater than N2, and N2 is greater than N1.

After the first normalization operation, the sampling data 401 to 403 may be adjusted to sampling data 411 to 413, respectively. All the sampling data 411 to 413 have a data length TS. The data length TS corresponds to M sampling points. In other words, all the sampling data 411 to 413 have the M sampling points. After the first normalization operation, the totals of the sampling points (or the sampling values) of the sampling data 401 to 403 are reduced to M. For example, in an embodiment, the time length T1 is 3600 seconds (e.g., corresponding to 3600 sampling points), the time length T2 is 7200 seconds (e.g., corresponding to 7200 sampling points), the time length T3 is 14400 seconds (e.g., corresponding to 14400 sampling points), and the time length TS is 1800 seconds (e.g., corresponding to 1800 sampling points).

In an embodiment, the first normalization operation includes a down sampling operation. For example, if the sampling data 403 with the time length T3 of 14400 seconds are to be converted into the sampling data 411 with the time length TS of 1800 seconds, the sampling values of 8 sampling points in the sampling data 403 will be converted into the sampling value of 1 sampling point (i.e., the down sampling operation). For example, the processor 112 can retain the largest one of the sampling values corresponding to the consecutive 8 sampling points in the sampling data 411 (a.k.a. a max pooling), so as to reduce the totals of the sampling points and the sampling values in the sampling data. For example, if the consecutive 8 sampling values in the sampling data 403 are [2, 2, 0, 1, 2, 10, 8, 0], then (only) the largest sampling value [10] among the 8 sampling values may be retained in the sampling data 413, whereas the remaining 7 sampling values may be filtered out. By analogy, the sampled data 411 and 412 can also be obtained.

In an embodiment, the processor 112 can perform another normalization operation (a.k.a. a second normalization operation) on the sampling data. The second normalization operation may be used to normalize a numerical range of the sampling values in the sampling data. For example, the processor 112 can perform the second normalization operation on the sampling data according to Equation (1) below:

$$X' = \frac{X - X_{min}}{X_{max} - X_{min}} \quad (1)$$

In Equation (1), X denotes one specific sampling value in the sampling data, $X_{min}$ denotes a minimal value of the specific sampling value, $X_{max}$ denote a maximal value of the specific sampling value, and X' denotes a new sampling value after the normalization. According to Equation (1), the sampling values in the sampling data may be adjusted to a value between 0 to 1, so as to reflect a numerical relationship between different sampling values in the same sampling data. Multiple sampling data (e.g., the sampling data 411 and 412 of FIG. 4) may also be compared based on this numerical relationship.

FIG. 5 is a schematic diagram illustrating a second normalization operation according to an embodiment of the disclosure. Referring to FIG. 5, it is assumed that sampling data 51 includes sampling values [0, 0, 10, 20, 50, 20, 30, 70, 80] corresponding to sampling points 1 to 9. After the second normalization operation is performed on the 9 sampling points, sampling data 52 may be obtained. For example, each new sampling value in the sampling data 52 may be obtained according to Equation (1). For example, if the maximal value of the sampling value is 100 and the minimal value of the sampling value is 0, the obtained new sampling values in the sampling data 52 may be [0, 0, 0.1, 0.2, 0.5, 0.2, 0.3, 0.7, 0.8] according to Equation (1). In an embodiment, if another sampling data include sampling values [0, 0, 1, 2, 5, 2, 3, 7, 8], the new sampling values in that sampling data may also be [0, 0, 0.1, 0.2, 0.5, 0.2, 0.3, 0.7, 0.8] after the second normalization operation. The same sampling values obtained after the second normalization operation is performed on the two sampling data indicate that the numerical relationships between the sampling values of the two sampling data are identical or similar. Therefore, in an embodiment, an analysis efficiency for the sampling data may be improved by the second normalization operation.

The processor 112 can generate an image according to the obtained sampling data. The sampling data for generating the image may be data processed by at least one of the first normalization operation and the second normalization operation or data not processed by the first normalization operation and the second normalization operation. The image can present a traffic feature of the analyzed network traffic data corresponding to the time length of the adopted sampling window. Taking FIG. 3 as an example, if the adopted sampling windows are the sampling windows 301 to 303, the generated images may reflect the traffic features of the network traffic data corresponding to the time lengths T1 to T3, respectively. In addition, in an embodiment of FIG. 1, if the target device 12 is already infected by the malware, the image may further present the traffic feature of the abnormal traffic (or the malware) corresponding to the time length of the adopted sampling window (a.k.a. the traffic feature of the abnormal traffic). According to the image, the processor 112 can generate the evaluation information.

In an embodiment, the processor 112 can convert the sampling data into a two-dimensional bit map. One dimension (a.k.a. a first dimension) of the two-dimensional bit map corresponds to the sampling points of the sampling data. Another dimension (a.k.a. a second dimension) of the two-dimensional bit map corresponds to the sampling values of the sampling data. Then, the processor 112 can generate the image according to the two-dimensional bit map. In addition, the processor 112 can determine, according to a bit value of one position (a.k.a. a first position) in the two-dimensional bit map, a pixel value of one position (a.k.a. a second position) corresponding to the first position in the generated image. In an embodiment, a two-dimensional coordinate of the first position is identical to a two-dimensional coordinate of the second position.

Figure 7:
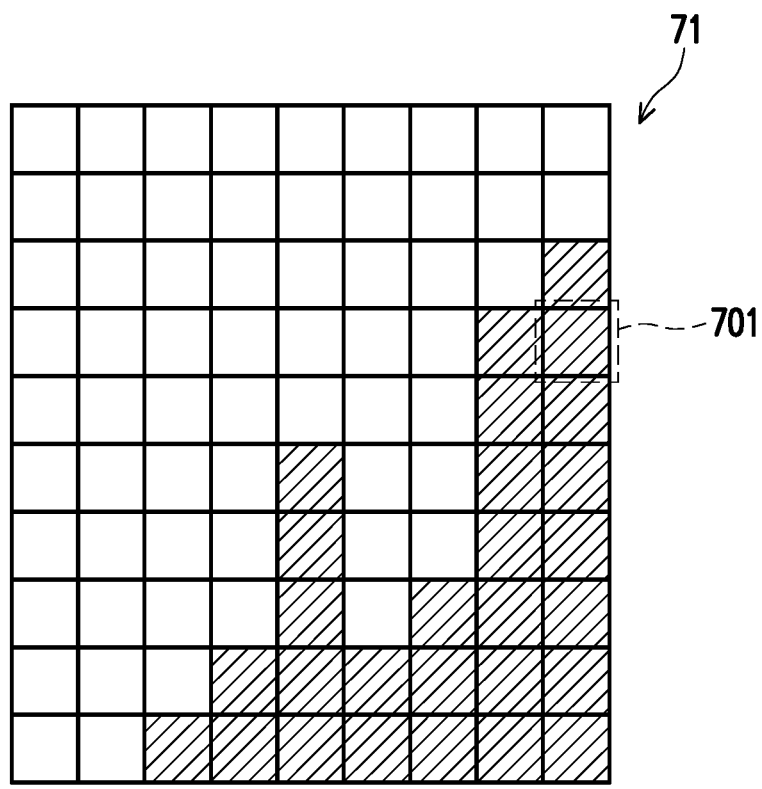
FIG. 7 is a schematic diagram illustrating an image according to an embodiment of the disclosure.

FIG. 6 is a schematic diagram illustrating a two-dimensional bit map according to an embodiment of the disclosure. FIG. 7 is a schematic diagram illustrating an image according to an embodiment of the disclosure.

Referring to FIG. 5, FIG. 6 and FIG. 7, a two-dimensional bit map 61 may be obtained according to the sampling data 52. The first dimension of the two-dimensional bit map 61 (i.e., in a horizontal axis direction) corresponds to the 9 sampling points of the sampling data 52. The second dimension of the two-dimensional bit map 61 (i.e., in a vertical axis direction) corresponds to the sampling values of the sampling data 52. For example, since the sampling values corresponding to the sampling points 1 and 2 of the sampling data 52 are 0, bits in the first and second columns in the two-dimensional bit map 61 are all 0. Since the sampling value corresponding to the sampling point 3 of the sampling data 52 is 0.1, one bit in the third column in the two-dimensional bit map 61 is 1, whereas the rest of bits are 0. Since the sampling value corresponding to the sampling point 4 of the sampling data 52 is 0.2, two bits in the fourth column in the two-dimensional bit map 61 are 1, whereas the rest of bits are 0. By analogy, the two-dimensional bit map 61 may be generated to reflect a numerical distribution state between the sampling points and the sampling values of the sampling data 52.

According to the two-dimensional bit map 61, an image 71 may be generated. For example, the pixel value of one position in the image 71 (a.k.a. a pixel position) may be determined according to the bit value of the corresponding position in the two-dimensional bit map 61. Assuming that a position 601 in FIG. 6 corresponds to a position 701 in FIG. 7, the bit value according to the position 601 is 1 (a.k.a. a first bit value), the pixel value of the position 701 may be determined as one pixel value (a.k.a. a first pixel value) corresponding to the first bit value. Alternatively, in another embodiment, if the bit value of the position 601 is 0 (a.k.a. a second bit value), the pixel value of the position 701 may be determined as another pixel value (a.k.a. a second pixel value) corresponding to the second bit value. A coordinate of the position 601 may be identical to a coordinate of the position 701.

In this embodiment, it is assumed that the first pixel value is a grayscale value of 255, and the first pixel value is a grayscale value of 0. Accordingly, if the bit value according to the position 601 is 1, the color presented by the position 701 is black. Alternatively, in another embodiment, if the bit value of the position 601 is 0, the color presented by the position 701 may be white. By analogy, the pixel values of all the positions in the image 71 may be determined according to the bit values of the corresponding positions in the two-dimensional bit map 61. In addition, in another embodiment, the pixel values corresponding to the first bit values and/or the second bit values may also be adjusted according to actual requirements. The disclosure is not limited in this regard. The image 71 can reflect the traffic feature of the sampling data 52 corresponding to the time length of the adopted sampling window.

In an embodiment, the processor 112 can automatically analyze the obtained image through a neural network architecture (a.k.a. a deep learning model). For example, the neural network architecture may adopt the VGG16 algorithm in the convolutional neural network. For example, the neural network architecture can analyze the image and automatically determine whether the traffic feature in the image includes or matches the traffic feature of the malware. The processor 112 can generate the evaluation information according to an image analysis result of the neural network architecture. In other words, the traditional data analysis may be replaced by an image analysis performed based on the neural network architecture to significantly reduce workload of the security experts and/or improve the analysis accuracy.

In an embodiment, the processor 112 can obtain training data. The training data may include data for a network traffic with the malware and data for a network traffic without the malware. The processor 112 can convert the training data into a training image according to the foregoing embodiments. For example, according to the training data for the network traffic with the malware, the training image for the network traffic with the malware may be generated. According to the training data for the network traffic without the malware, the training image for the network traffic without the malware may be generated. The processor 112 can train the neural network architecture according to the training images. For example, the processor 112 can input the training images and answers to the neural network architecture. The neural network architecture can compare analysis results of the training images with the answers and adjust determination weights. After continuous training, the analysis accuracy for determining whether the traffic feature of the malware exists in the image can be gradually improved.

Figure 8:
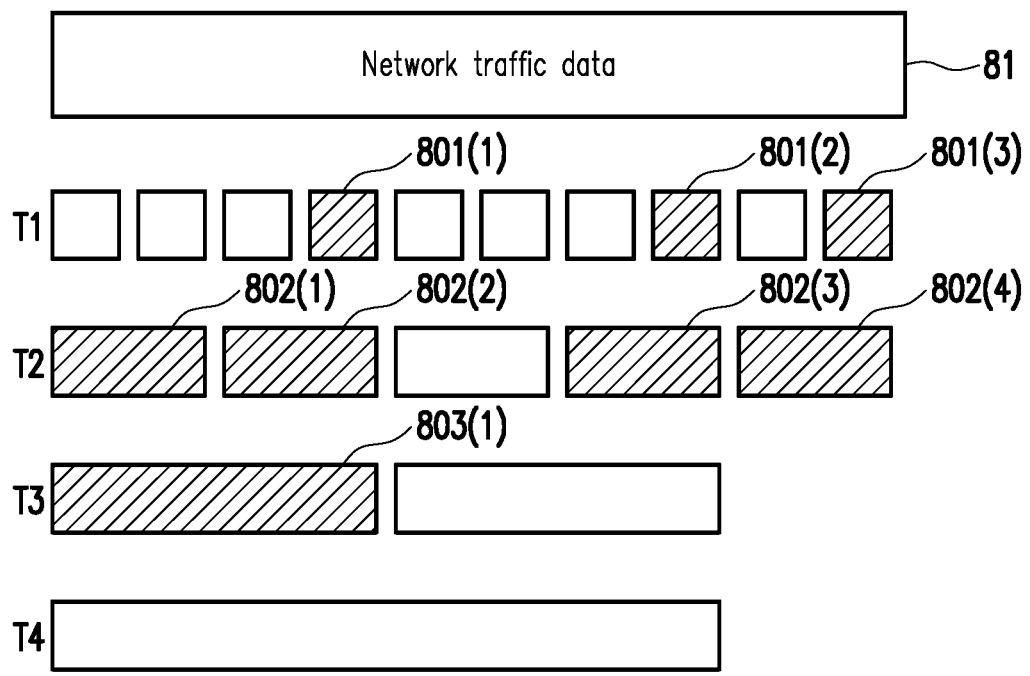
FIG. 8 is a schematic diagram illustrating an analysis result according to an embodiment of the disclosure.

FIG. 8 is a schematic diagram illustrating an analysis result according to an embodiment of the disclosure. Referring to FIG. 8, it should be noted that in FIG. 8, the sampling data determined as having the traffic feature of the abnormal traffic are marked by oblique lines. After the network traffic data are sampled by a plurality of sampling windows corresponding to time lengths T1 to T4, the image analysis result can present that sampling data 801(1) to 801(3) corresponding to the time length T1, sampling data 802(1) to 802(4) corresponding to the time length T2 and sampling data 803(1) corresponding to the time length T3 have the traffic feature of the abnormal traffic. This analysis result may be used to generate the evaluation information. The evaluation information can reflect whether the network traffic data of the target device 12 include the abnormal traffic, and the type and/or the risk level of the abnormal traffic.

In an embodiment, according to the evaluation information, the processor 112 may also determine whether the target device 12 is infected by the malware, a probability that the target device 12 is infected by the malware, whether the target device 12 belongs to a part of Botnet, a probability that the target device 12 belongs to a part of Botnet, a type of the malware infected and/or a risk level of the malware.

In an embodiment, the generated evaluation information may include at least one of a source address of the network traffic data (i.e., the source IP address), a destination address of the network traffic data (i.e., the destination IP address), a total time length of the network traffic data, an occurrence rate of the traffic feature of the abnormal traffic in the network traffic data and the time length of the adopted sampling window. Taking FIG. 8 as an example, for the sampling data with the time length of T2, the occurrence rate of the traffic feature of the abnormal traffic in network traffic data 81 is approximately 0.8 (i.e., there are 4 sampling data 802(1) to 802(4) among 5 sampling data showing the traffic feature of the abnormal traffic). In an embodiment, the occurrence rate of the traffic feature of the abnormal traffic in network traffic data may also be represented by a beacon. A value of the beacon may be identical to or positively correlated to the occurrence rate.

In an embodiment, sampling and analysis results corresponding to at least two time lengths may be used to generate the evaluation information. Accordingly, the generated evaluation information cover the sampling and analysis results corresponding to the at least two time lengths. Nonetheless, in another embodiment, a sampling and analysis result corresponding to only one single time length may also be used to generate the evaluation information. For example, in an embodiment, one can select the sampling and analysis result corresponding to the time length with the highest occurrence rate (or beacon) of the traffic feature of the abnormal traffic. Taking FIG. 8 as an example, corresponding to the time length T1 to T4, the occurrence rates (or beacons) of the abnormal traffic in the network traffic data 81 are approximately 0.3, 0.8, 0.5, and 0, respectively. Therefore, in an embodiment of FIG. 8, one can select only the sampling and analysis result corresponding to the time length T2 to generate the evaluation information.

Figure 9:
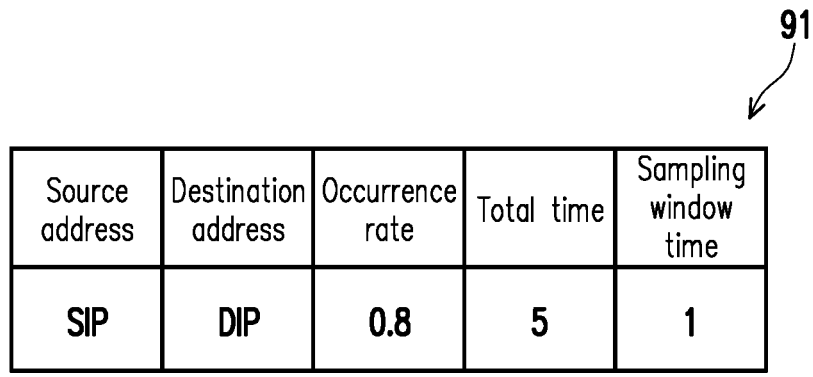
FIG. 9 is a schematic diagram illustrating evaluation information according to an embodiment of the disclosure.

FIG. 9 is a schematic diagram illustrating evaluation information according to an embodiment of the disclosure. Referring to FIG. 8 and FIG. 9, in an embodiment, evaluation information 91 may include a source address (SIP), a destination address (DIP), an occurrence rate (or beacon) (0.8), a total time (5) and a sampling window time (1). The source address of SIP can reflect the IP address of the target device 12 of FIG. 1. The destination address of DIP can reflect the IP address of the malicious server 13 of FIG. 1. The occurrence rate (or beacon) of 0.8 can reflect the occurrence rate (or beacon) of the traffic feature of the abnormal traffic in the network traffic data 81 for the time length T2. The total time of 5 can reflect that the (total) time length of the network traffic data 81 is 5 hours. The sampling window time of 1 can reflect that the time length T2 is 1 hour.

In an embodiment, the processor 112 can evaluate the risk level of the abnormal traffic based on the (total) time length of the network traffic data and the occurrence rate (or beacon) of the traffic feature of the abnormal traffic in the network traffic data. In an embodiment, the (total) time length of the network traffic data and/or the occurrence rate (or beacon) are positively correlated to the risk level of the determined abnormal traffic.

Figure 10:
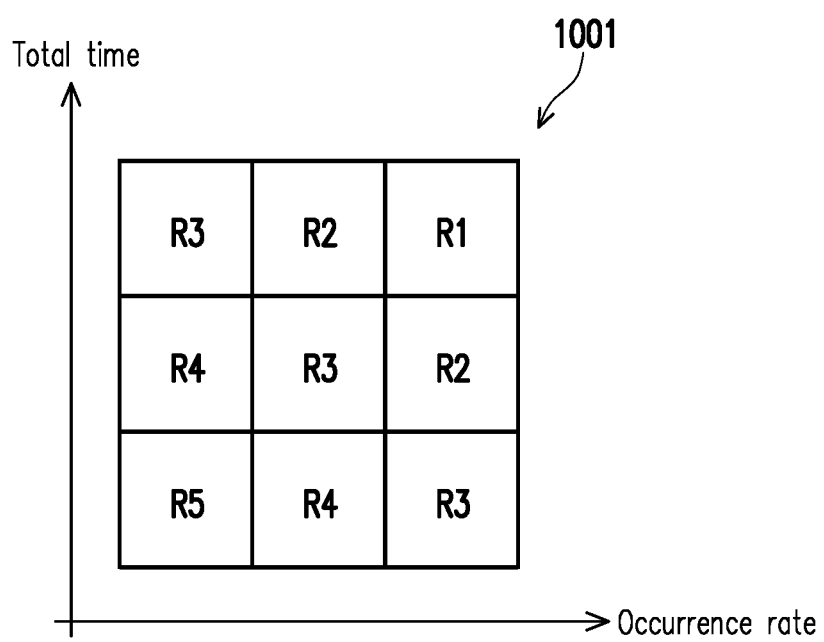
FIG. 10 is a schematic diagram illustrating a risk level according to an embodiment of the disclosure.

FIG. 10 is a schematic diagram illustrating a risk level according to an embodiment of the disclosure. Referring to FIG. 10, a risk distribution map 1001 includes regions R1 to R5. The risk distribution map 1001 can represent the risk levels of the abnormal traffic corresponding to a combination of the (total) time lengths of the different network traffic data and the occurrence rates (or beacons). The risk levels corresponding to the regions R1 to R5 are decremented. That is, the region R1 corresponds to the highest risk level, and the region R5 corresponds to the lowest risk level. For example, the occurrence rate (or beacon) on a horizontal axis may be divided into a first numerical interval (e.g., 0 to 0.33), a second numerical interval (e.g., 0.33 to 0.66) and a third numerical interval (e.g., 0.66 to 1). The (total) time length of the network traffic data on a vertical axis may also be divided into a first total time interval (e.g., within 1 hour), a second total time interval (e.g., within 1 day) and a third total time interval (e.g., 1 within 1 month). Taking the evaluation information 91 of FIG. 9 as an example, because the occurrence rate of the abnormal traffic is 0.8 and falls in the third numerical interval and the total time of the network traffic data is 5 hours and falls in the second total time interval, the obtained risk level of the abnormal traffic is R2. Similarly, the risk level of the abnormal traffic may be obtained by checking the risk distribution map 1001 for the occurrence rate of the abnormal traffic and the total time length of the network traffic data.

In an embodiment, the traffic feature of the abnormal traffic (or the malware) for the time length within a relatively short time range (e.g., the time lengths T1 or T2 of FIG. 8) is also known as a high frequency feature. For example, the malware in the target device 12 may communicate with the malicious server 13 very frequently in a short period of time. Accordingly, the high frequency feature can be obtained only by analyzing the network traffic data within the relatively short time range. Relatively, the traffic feature of the abnormal traffic (or the malware) for the time length within a relatively long time range (e.g., the time lengths T3 or T4) is also known as a low frequency feature. For example, the malware in the target device 12 may communicate with the malicious server 13 very discretely in a long period of time. Therefore, the low frequency feature can be obtained only by analyzing the network traffic data within the relatively long time range. In an embodiment, the sampling and subsequent image analysis performed according to the sampling windows with at least two time lengths can effectively detect the abnormal traffic matching the high frequency feature and the abnormal traffic matching the low frequency feature so that the analysis accuracy can be effectively improved.

Figure 11:
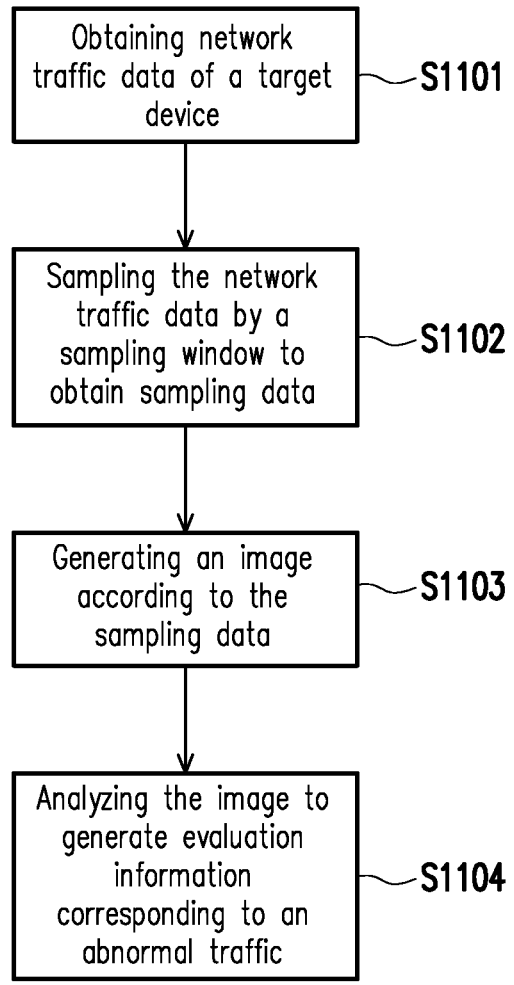
FIG. 11 is a flowchart illustrating an abnormal traffic detection method according to an embodiment of the disclosure.

FIG. 11 is a flowchart illustrating an abnormal traffic detection method according to an embodiment of the disclosure. Referring to FIG. 11, in step S1101, network traffic data of a target device is obtained. In step S1102, the network traffic data is sampled by a sampling window to obtain sampling data. The sampling window has a time length. In step S1103, an image is generated according to the sampling data. The image presents a traffic feature of the network traffic data corresponding to the time length. In step S1104, the image is analyzed to generate evaluation information corresponding to an abnormal traffic.

Figure 12:
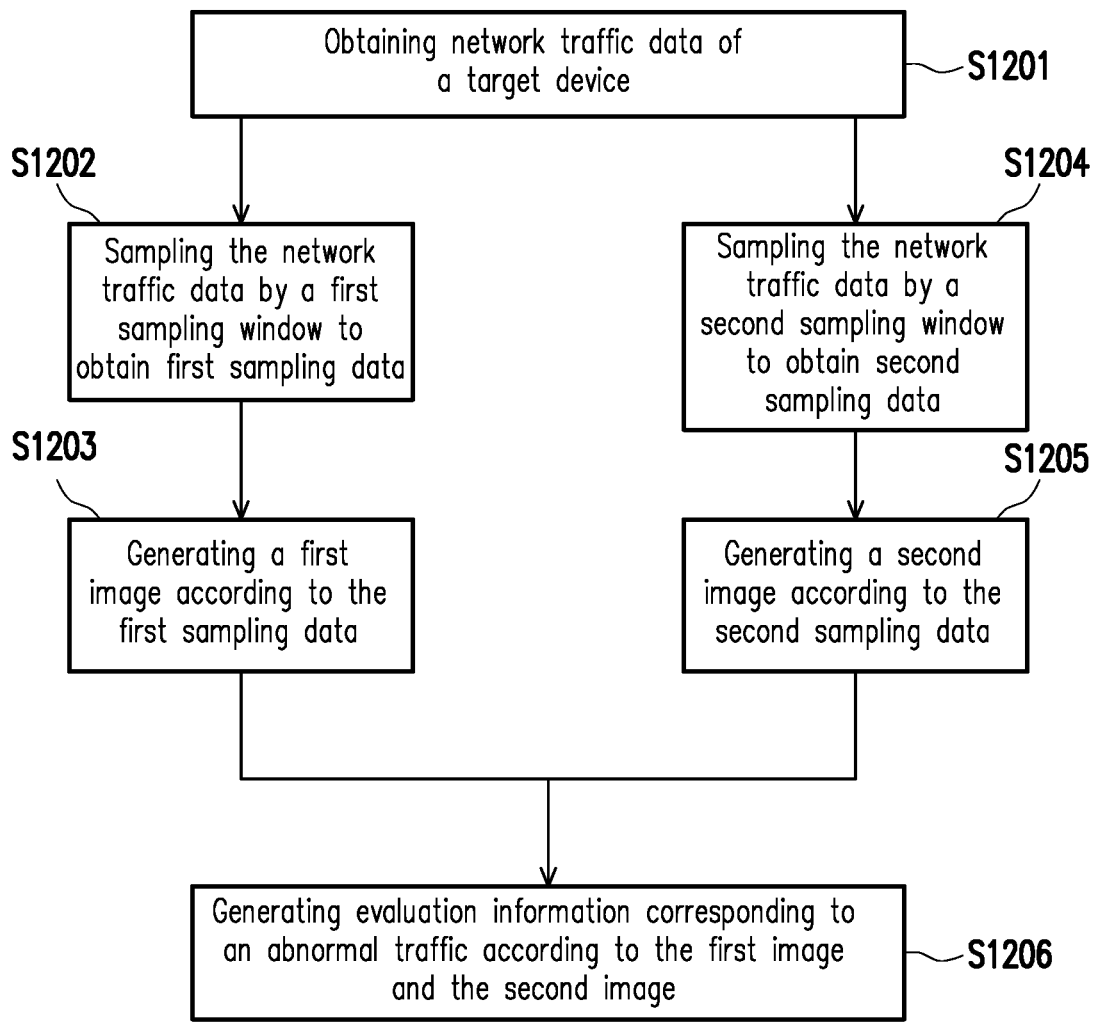
FIG. 12 is a flowchart illustrating an abnormal traffic detection method according to an embodiment of the disclosure.

FIG. 12 is a flowchart illustrating an abnormal traffic detection method according to an embodiment of the disclosure. Referring to FIG. 12, in step S1201, network traffic data of a target device is obtained. In step S1202, the network traffic data is sampled by one sampling window (a.k.a. a first sampling window) to obtain sampling data (a.k.a. first sampling data). The first sampling window has a first time length. In step S1203, one image (a.k.a. a first image) is generated according to the first sampling data. The first image presents a traffic feature of the network traffic data corresponding to the first time length. In step S1204, the network traffic data is sampled by another sampling window (a.k.a. a second sampling window) to obtain sampling data (a.k.a. second sampling data). The second sampling window has a second time length. The first time length is different from the second time length. In step S1203, another image (a.k.a. a second image) is generated according to the second sampling data. The second image presents a traffic feature of the network traffic data corresponding to the second time length. In step S1206, the first image and the second image are analyzed to generate evaluation information corresponding to an abnormal traffic.

Nevertheless, each of steps depicted in FIG. 11 and FIG. 12 have been described in detail as above, thus related description thereof is not repeated hereinafter. It should be noted that, the steps depicted in FIG. 11 and FIG. 12 may be implemented as a plurality of program codes or circuits, which are not particularly limited in the disclosure. Moreover, the methods disclosed in FIG. 11 and FIG. 12 may be implemented with reference to above embodiments, or may be implemented separately, which are not particularly limited in the disclosure.

In summary, the embodiments of the disclosure can sample the network traffic data by the sampling window with at least one time length and automatically detect the abnormal traffic that may be caused by the malware by the image analysis mechanism. In this way, compared with traditionally relying on security experts to conduct a large amount of traffic data analysis, the abnormal traffic detection method and the abnormal traffic detection device of the embodiments of the disclosure can effectively improve the detection efficiency for the abnormal traffic by an automated image analysis. The embodiment of the disclosure can also detect the high frequency feature and the low frequency feature of the abnormal traffic (or the malware) by analyzing the sampling data of the different time lengths to improve the detection accuracy. In addition, the detected abnormal traffic can be further used to detect the malware and/or Botnet and improve the performance of the abnormal traffic detection device.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An abnormal traffic detection method, comprising:
obtaining network traffic data of a target device;
sampling the network traffic data by a sampling window to obtain sampling data, wherein the sampling window has a time length;
generating an image according to the sampling data, wherein the image presents a traffic feature of the network traffic data corresponding to the time length, and the traffic feature presented by the image reflects a data transmission amount corresponding to a plurality of sampling points of the sampling data; and
performing an image analyzation on the image, by a deep learning model trained for image identification, to generate evaluation information corresponding to an abnormal traffic,
wherein the step of generating the image according to the sampling data comprises:
performing a normalization operation on the sampling data to adjust a total number of a plurality of sampling values corresponding to the sampling points, such that the adjusted total number of the sampling values meets a total number of a plurality of pixel positions along a first dimension in the image, wherein each of the sampling values reflects a data transmission amount corresponding to one of the sampling points; and
converting the sampling values to a plurality of pixel values corresponding to the pixel positions in the image.

2. The abnormal traffic detection method according to claim 1, further comprising:
selecting the time length from a plurality of candidate time lengths; and
generating the sampling window according to the time length.

3. The abnormal traffic detection method according to claim 1, wherein the step of sampling the network traffic data by the sampling window to obtain the sampling data comprises:
filtering the network traffic data according to a white list; and
sampling the filtered network traffic data by the sampling window to obtain the sampling data.

4. The abnormal traffic detection method according to claim 1, wherein the step of converting the sampling values to the plurality of pixel values corresponding to the pixel positions in the image comprises:
generating a two-dimensional bit map, wherein a first dimension of the two-dimensional bit map corresponds to the plurality of sampling points, and a second dimension of the two-dimensional bit map corresponds to the plurality of sampling values; and
generating the image according to the two-dimensional bit map.

5. The abnormal traffic detection method according to claim 4, wherein the step of generating the image according to the two-dimensional bit map comprises:
determining, according to a bit value of a first position in the two-dimensional bit map, a pixel value of a second position corresponding to the first position in the image.

6. The abnormal traffic detection method according to claim 1, wherein the evaluation information comprise at least one of a source address of the network traffic data, a destination address of the network traffic data, a total time length of the network traffic data, an occurrence rate of the traffic feature of the abnormal traffic in the network traffic data and the time length of the sampling window.

7. The abnormal traffic detection method according to claim 6, further comprising:
evaluating a risk level of the abnormal traffic according to the occurrence rate and the total time length of the network traffic data.

8. An abnormal traffic detection device, comprising:
a storage device, storing network traffic data of a target device; and
a processor, coupled to the storage device,
wherein the processor samples the network traffic data by a sampling window to obtain sampling data, the sampling data has a time length, and
the processor generates an image according to the sampling data, wherein the image presents a traffic feature of the network traffic data corresponding to the time length, and the traffic feature presented by the image reflects a data transmission amount corresponding to a plurality of sampling points of the sampling data, and
the processor performs an image analyzation on the image, by a deep learning model trained for image identification, to generate evaluation information corresponding to an abnormal traffic,
wherein the operation of generating the image according to the sampling data comprises:
performing a normalization operation on the sampling data to adjust a total number of a plurality of sampling values corresponding to the sampling points, such that the adjusted total number of the sampling values meets a total number of a plurality of pixel positions along a first dimension in the image, wherein each of the sampling values reflects a data transmission amount corresponding to one of the sampling points; and
converting the sampling values to a plurality of pixel values corresponding to the pixel positions in the image.

9. The abnormal traffic detection device according to claim 8, wherein the processor further selects the time length from a plurality of candidate time lengths and generates the sampling window according to the time length.

10. The abnormal traffic detection device according to claim 8, wherein the operation of the processor sampling the network traffic data by the sampling window to obtain the sampling data comprises:
filtering the network traffic data according to a white list; and
sampling the filtered network traffic data by the sampling window to obtain the sampling data.

11. The abnormal traffic detection device according to claim 9, wherein the operation of the processor converting the sampling values to the plurality of pixel values corresponding to the pixel positions in the image comprises:
generating a two-dimensional bit map, wherein a first dimension of the two-dimensional bit map corresponds to the plurality of sampling points, and a second dimension of the two-dimensional bit map corresponds to the plurality of sampling values; and
generating the image according to the two-dimensional bit map.

12. The abnormal traffic detection device according to claim 11, wherein the operation of the processor generating the image according to the two-dimensional bit map comprises:

determining, according to a bit value of a first position in the two-dimensional bit map, a pixel value of a second position corresponding to the first position in the image.

13. The abnormal traffic detection device according to claim 8, wherein the evaluation information comprise at least one of a source address of the network traffic data, a destination address of the network traffic data, a total time length of the network traffic data, an occurrence rate of the traffic feature of the abnormal traffic in the network traffic data and the time length of the sampling window.

14. The malware detection device according to claim 13, wherein the processor is further configured to evaluate a risk level according to the occurrence rate and the total time length of the network traffic data.

15. An abnormal traffic detection method, comprising:
obtaining network traffic data of a target device;
sampling the network traffic data by a first sampling window to obtain first sampling data, wherein the first sampling window has a first time length;
sampling the network traffic data by a second sampling window to obtain second sampling data, wherein the second sampling window has a second time length, and the first time length is different from the second time length;
generating a first image according to the first sampling data, wherein the first image reflects a data transmission amount corresponding to a plurality of first sampling points;
generating a second image according to the second sampling data, wherein the second image reflects a data transmission amount corresponding to a plurality of second sampling points; and
generating evaluation information corresponding to an abnormal traffic according to the first image and the second images wherein the step of generating the first image according to the first sampling data comprises:
performing a normalization operation on the first sampling data to adjust a total number of a plurality of sampling values corresponding to the first sampling points, such that the adjusted total number of the sampling values meets a total number of a plurality of pixel positions along a first dimension in the first image, wherein each of the sampling values reflects a data transmission amount corresponding to one of the first sampling points; and
converting the sampling values to a plurality of pixel values corresponding to the pixel positions in the first image.

16. An abnormal traffic detection device, comprising:
a storage device, storing network traffic data of a target device; and
a processor, coupled to the storage device,
wherein the processor samples the network traffic data by a first sampling window to obtain first sampling data, and the first sampling data has a first time length,
the processor samples the network traffic data by a second sampling window to obtain second sampling data, the second sampling window has a second time length, and the first time length is different from the second time length,
the processor generates a first image according to the first sampling data, wherein the first image reflects a data transmission amount corresponding to a plurality of first sampling points,
the processor generates a second image according to the second sampling data, wherein the second image reflects a data transmission amount corresponding to a plurality of second sampling points, and
the processor generates evaluation information corresponding to an abnormal traffic according to the first image and the second image,
wherein the operation of generating the first image according to the first sampling data comprises:
performing a normalization operation on the first sampling data to adjust a total number of a plurality of sampling values corresponding to the first sampling points, such that the adjusted total number of the sampling values meets a total number of a plurality of pixel positions along a first dimension in the first image, wherein each of the sampling values reflects a data transmission amount corresponding to one of the first sampling points; and
converting the sampling values to a plurality of pixel values corresponding to the pixel positions in the first image.

\* \* \* \* \*